United States Patent
Lee et al.

(10) Patent No.: US 12,345,978 B2
(45) Date of Patent: Jul. 1, 2025

(54) ANTI-GLARE FILM, POLARIZING PLATE AND DISPLAY APPARATUS

(71) Applicant: LG CHEM, LTD., Seoul (KR)

(72) Inventors: Hanna Lee, Daejeon (KR); Seung Hun Lee, Daejeon (KR); Jung Hyun Seo, Daejeon (KR); Jinseok Byun, Daejeon (KR); Yeongrae Chang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 435 days.

(21) Appl. No.: 18/004,976

(22) PCT Filed: Jul. 20, 2021

(86) PCT No.: PCT/KR2021/009325
§ 371 (c)(1),
(2) Date: Jan. 10, 2023

(87) PCT Pub. No.: WO2022/019610
PCT Pub. Date: Jan. 27, 2022

(65) Prior Publication Data
US 2023/0341590 A1    Oct. 26, 2023

(30) Foreign Application Priority Data

Jul. 20, 2020 (KR) .................. 10-2020-0089832
Jul. 20, 2020 (KR) .................. 10-2020-0089833
Jul. 23, 2020 (KR) .................. 10-2020-0091827

(51) Int. Cl.
*G02B 1/18* (2015.01)
*G02B 1/111* (2015.01)
*G02F 1/1335* (2006.01)

(52) U.S. Cl.
CPC ........ *G02F 1/133502* (2013.01); *G02B 1/111* (2013.01); *G02B 1/18* (2015.01)

(58) Field of Classification Search
CPC ..... G02F 1/133502; G02B 1/111; G02B 1/18; G02B 1/14; G02B 1/11; G02B 5/02; G02B 5/30; G02B 1/1335; H01L 27/32
See application file for complete search history.

(56) References Cited

U.S. PATENT DOCUMENTS 10,414,121 B2    9/2019   Iwahashi et al.
2014/0247486 A1  9/2014   Shibata et al.
(Continued)

FOREIGN PATENT DOCUMENTS

JP    2012-234164 A    11/2012
JP    2013-141771 A     7/2013
(Continued)

OTHER PUBLICATIONS

International Search Report dated Nov. 1, 2021, issued in the corresponding International Application No. PCT/KR2021/009323, 4 pages.
(Continued)

*Primary Examiner* — Balram T Parbadia
(74) *Attorney, Agent, or Firm* — Ricky Lam

(57) ABSTRACT

The present disclosure relates to an anti-glare film including an acrylic substrate and a coating layer located on at least one side of the acrylic substrate, which has a specific rate of change of band area ratio in a graph derived from the result of Raman spectroscopy performed for the coating layer in the thickness direction. It also relates to a polarizing plate, and a display apparatus including the same.

20 Claims, 5 Drawing Sheets

(56) References Cited

U.S. PATENT DOCUMENTS

| | | | |
|---|---|---|---|
| 2015/0036298 A1 | 2/2015 | Kim et al. | |
| 2015/0316696 A1* | 11/2015 | Kamijo | G02B 1/14 359/487.02 |
| 2015/0355385 A1 | 12/2015 | Horii et al. | |
| 2016/0033700 A1* | 2/2016 | Kitagawa | G02B 1/14 359/487.02 |
| 2016/0146978 A1 | 5/2016 | Lee | |
| 2016/0368241 A1* | 12/2016 | Iwahashi | B32B 23/04 |
| 2019/0225831 A1 | 7/2019 | Seo et al. | |
| 2021/0116605 A1 | 4/2021 | Kim et al. | |

FOREIGN PATENT DOCUMENTS

| | | |
|---|---|---|
| JP | 2015-014735 A | 1/2015 |
| JP | 2015-180929 A | 10/2015 |
| JP | 2016-045448 A | 4/2016 |
| JP | 2019-533186 A | 11/2019 |
| JP | 2020-074016 A | 5/2020 |
| KR | 10-2011-0022559 A | 3/2011 |
| KR | 10-1432987 B1 | 8/2014 |
| KR | 10-2015-0015314 A | 2/2015 |
| KR | 10-2015-0100663 A | 9/2015 |
| KR | 10-2016-0088000 A | 7/2016 |
| KR | 10-2018-0070494 A | 6/2018 |
| KR | 10-2018-0112074 A | 10/2018 |
| KR | 10-2019-0011138 A | 2/2019 |
| WO | 2014-204273 A1 | 12/2014 |
| WO | 2020-101396 A1 | 5/2020 |

OTHER PUBLICATIONS

W. Schrof et al., "Depth-resolved characterization of UV cured coatings by confocal Raman and two-photon microscopy", Progress in Organic Coatings, 2001, vol. 43, Issue. 1-3, pp. 1-9.

International Search Report dated Oct. 21, 2021, issued in the corresponding International Application No. PCT/KR2021/009325, 4 pages.

* cited by examiner

[FIG. 1]
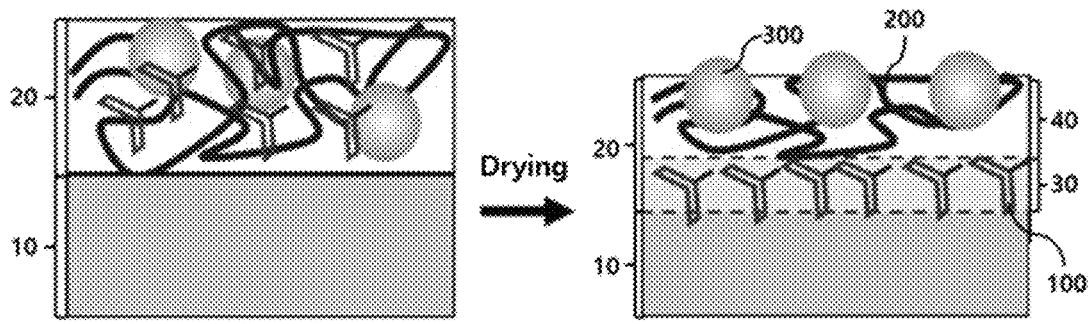
[FIG. 2]
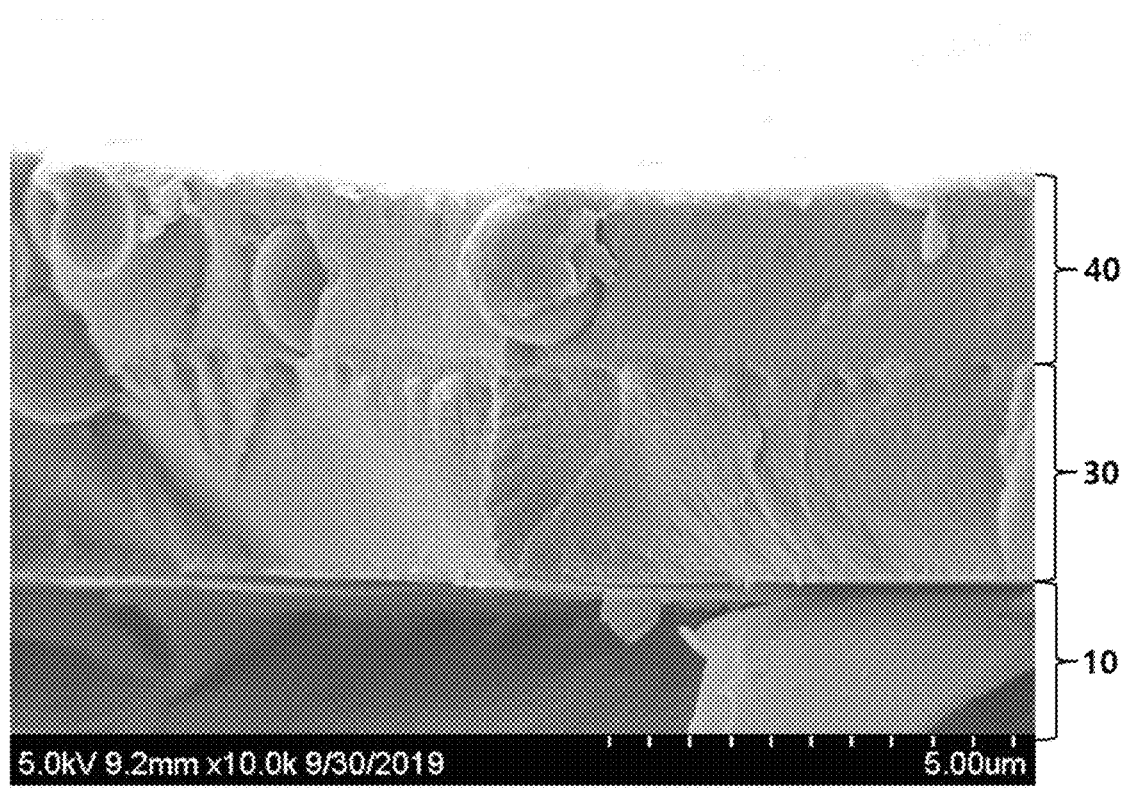

[FIG. 3]
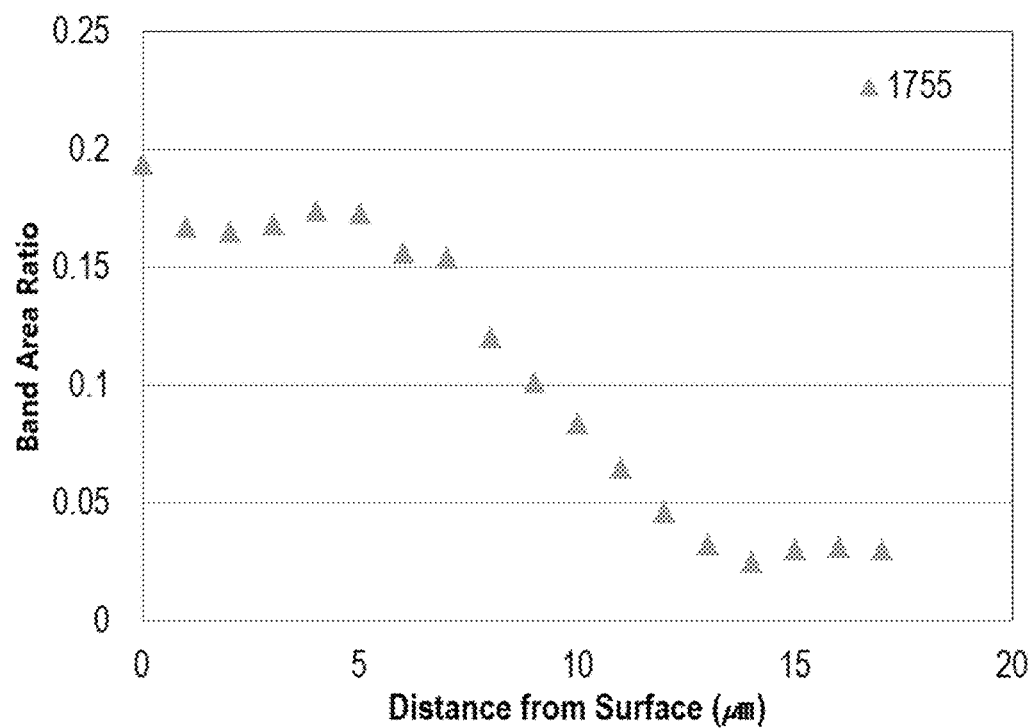

[FIG. 4]
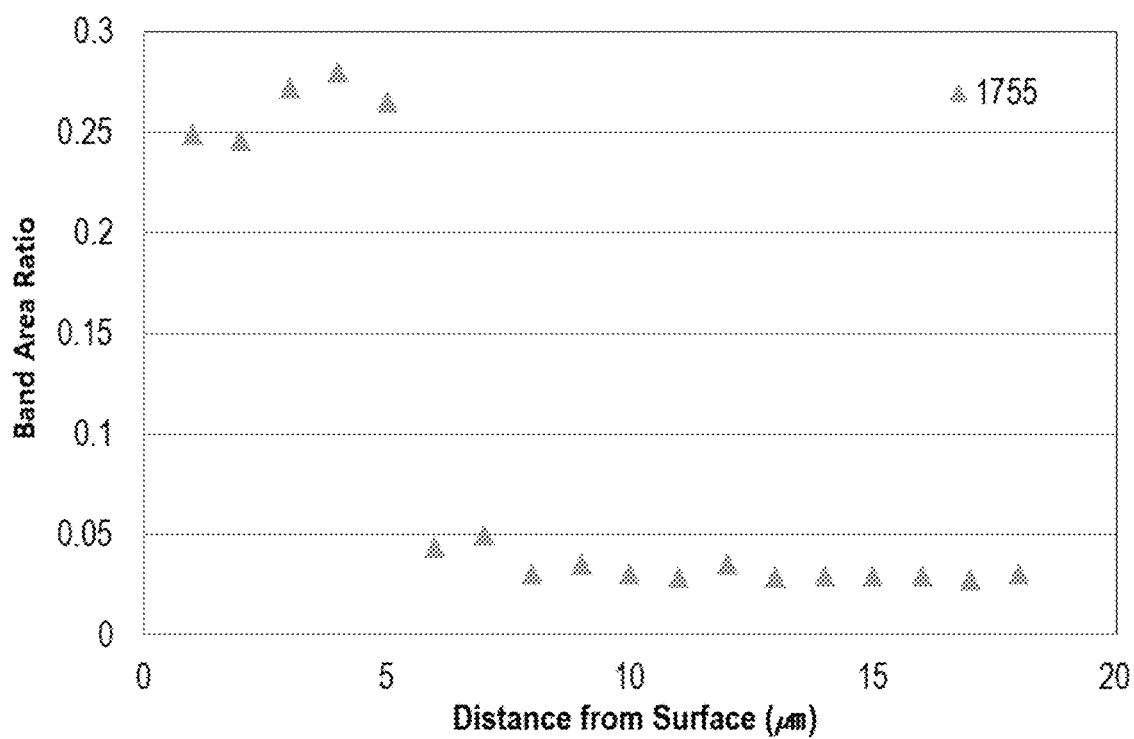

[FIG. 5]
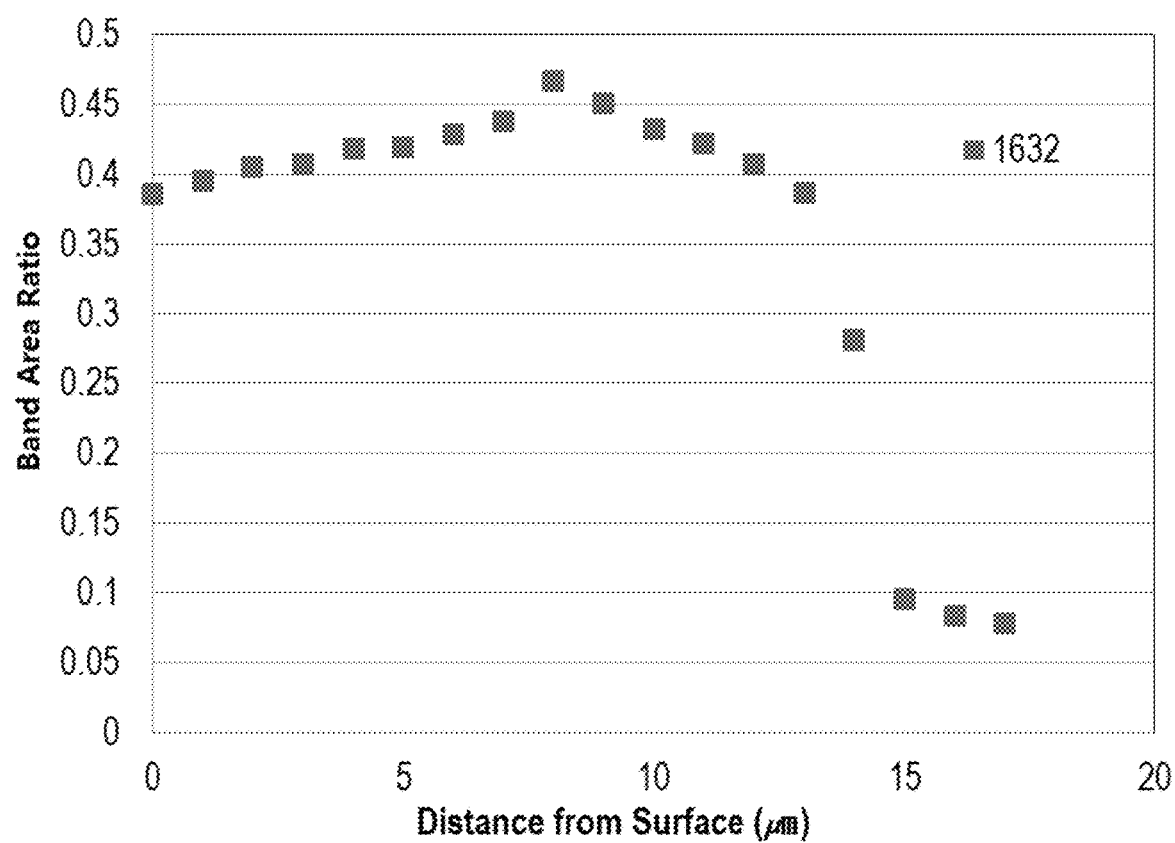

[FIG. 6]
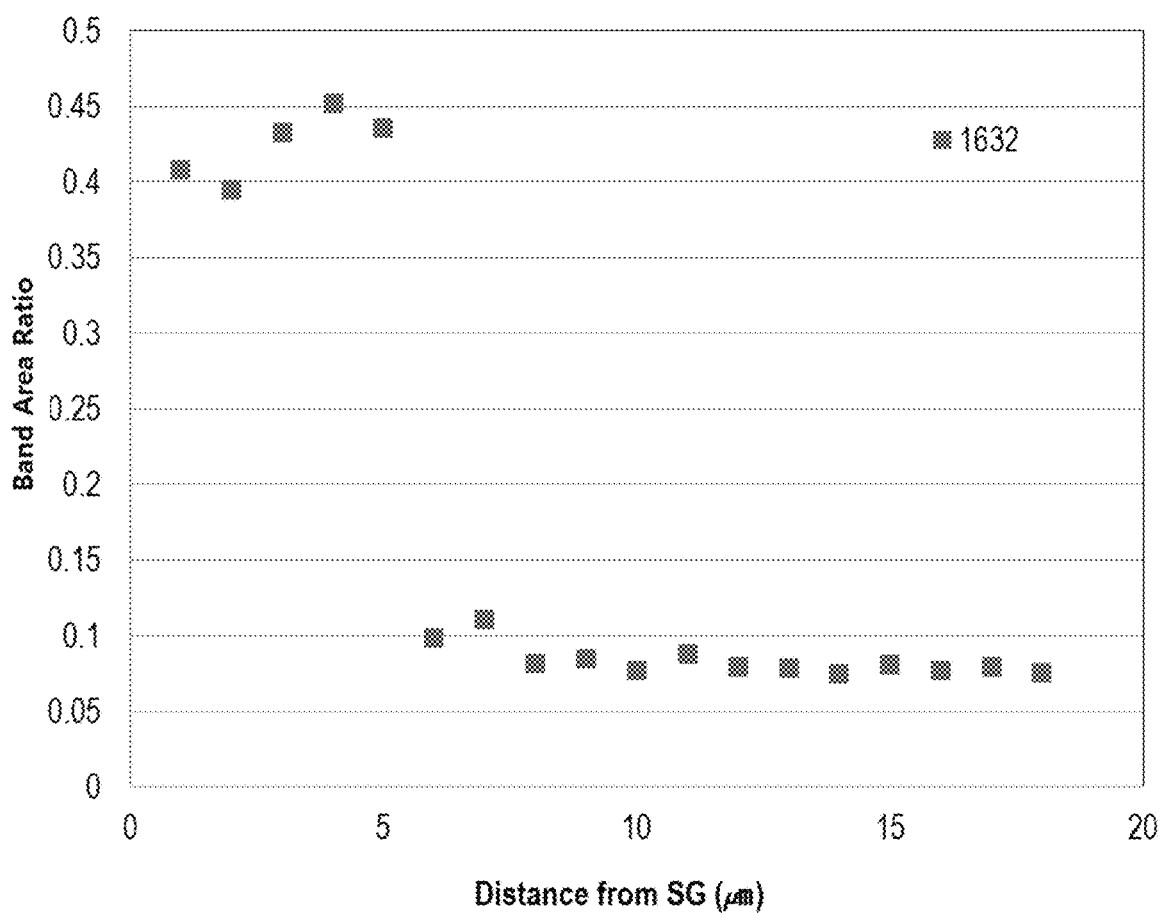

ANTI-GLARE FILM, POLARIZING PLATE AND DISPLAY APPARATUS

CROSS-REFERENCE TO RELATED APPLICATION(S)

Technical Field

This application is a 35 U.S.C. 371 National Phase Entry Application from PCT/KR2021/009325 filed Jul. 20, 2021, which claims the benefits of Korean Patent Applications No. 10-2020-0089832 filed on Jul. 20, 2020, No. 10-2020-0089833 filed on Jul. 20, 2020 and No. 10-2020-0091827 filed on Jul. 23, 2020 with the Korean Intellectual Property Office, the disclosures of which are incorporated herein by reference in their entirety.

The present disclosure relates to an anti-glare film, a polarizing plate, and a display apparatus including the same.

BACKGROUND OF THE INVENTION

As flat panel display technology develops toward large-area and high-resolution displays, applied products are changing from home and office applications such as TVs, monitors, and mobiles to large displays such as outdoor billboards and electronic signs. If flat panel displays such as LCDs, PDPs, OLEDs, rear-projection TVs are exposed to external light such as sunlight, a user feels fatigue in his/her eyes or a headache due to light reflecting from surfaces, and images made in displays are not clearly considered.

In order to solve the disadvantages, an anti-glare film is applied to scatter external light from the surface by forming irregularities on the surface of the display or to induce internal scattering by using the refractive index between the resin and particles which form the coating layer. Conventional anti-glare films mainly used a triacetyl cellulose (TAC) film as a substrate film, but this triacetyl cellulose film has a disadvantage of low moisture permeability.

Recently, an acrylic film is used as a substrate film to replace the triacetyl cellulose film having low moisture permeability, but there is a problem in that adhesion between the acrylic film and the coating layer formed on the acrylic film is significantly deteriorated during the stretching process for improving mechanical properties of the acrylic film.

In order to solve this problem, the coating layer can be formed after forming a primer layer on the acrylic film. However, the cost increases as the process for forming the primer layer is added, and it is difficult to develop a universal primer applicable to all substrate films.

BRIEF SUMMARY OF THE INVENTION

In the present disclosure, there is provided an anti-glare film having excellent optical properties such as low haze, high light transmittance and high anti-glare properties with excellent adhesion between a substrate film and a coating layer while having excellent mechanical properties such as good scratch resistance and high hardness.

In addition, there is provided a polarizing plate including the above anti-glare film.

In the present disclosure, there is also provided a display apparatus including the above anti-glare film.

In the present disclosure, there is provided an anti-glare film including an acrylic substrate and a coating layer located on at least one side of the acrylic substrate, wherein in a graph derived from the result of Raman spectroscopy performed for the coating layer in the thickness direction from one side of the coating layer opposite to the acrylic substrate having the Y axis of a ratio of band area at the Raman peak of 1755 $cm^{-1}$ to band area at the Raman peak of 1722 $cm^{-1}$ and the X axis of a distance in the thickness direction from one side of the coating layer opposite to the acrylic substrate, a rate of change of band area ratio according to the following Equation 1 is 0.001 to 0.033/μm:

$$\text{Rate of change of band area ratio} = |A_2 - A_1|/3 \quad \text{[Equation 1]}$$

In the Equation 1,
$A_1$ is the Y value when the X value is 4 μm, and
$A_2$ is the Y value when the X value is 7 μm.

In addition, there is also provided an anti-glare film including an acrylic substrate and a coating layer located on at least one side of the acrylic substrate, wherein in a graph derived from the result of Raman spectroscopy performed for the coating layer in the thickness direction from one side of the coating layer opposite to the acrylic substrate having the Y axis of a ratio of band area at the Raman peak of 1632 $cm^{-1}$ to band area at the Raman peak of 1722 $cm^{-1}$ and the X axis of a distance in the thickness direction from one side of the coating layer opposite to the acrylic substrate, a rate of change of band area ratio according to the following Equation 2 is 0.001 to 0.050/μm:

$$\text{Rate of change of band area ratio} = |A_4 - A_3|/3 \quad \text{[Equation 2]}$$

In the Equation 2,
$A_3$ is the Y value when the X value is 4 μm, and
$A_4$ is the Y value when the X value is 7 μm.

In addition, there is provided a polarizing plate including the above anti-glare film.

In the present disclosure, there is also provided a display apparatus including the above anti-glare film.

DETAILED DESCRIPTION OF THE INVENTION

Hereinafter, the anti-glare film, the polarizing plate and the display apparatus including the same according to specific embodiments of the present disclosure will be described in more detail In the present disclosure, the (meth)acrylate includes both acrylate and methacrylate.

In the present disclosure, the photopolymerizable functional group collectively refers to a functional group that causes a polymerization reaction when light such as visible light or ultraviolet light is irradiated.

In the present disclosure, the weight average molecular weight refers to a weight average molecular weight converted with polystyrene measured by gel permeation chromatography (GPC). In the process of measuring the weight average molecular weight converted with polystyrene measured by the GPC method, a commonly known analyzer, a detector such as a refractive index detector and a column for analysis may be used, and generally applied temperature conditions, solvents, and flow rates may be applied. For example, the measurement may be performed using Waters PL-GPC220 and a Polymer Laboratories PLgel MIX-B 300 mm length column. An evaluation temperature is 160° C., and 1,2,4-trichlorobenzene is used for a solvent at a flow rate of 1 mL/min. The sample at a concentration of 10 mg/10 mL is supplied in an amount of 200 μL. Mw can be obtained using a calibration curve formed using a polystyrene standard. 9 kinds of the polystyrene standard are used with the molecular weight of 2,000/10,000/30,000/70,000/200,000/700,000/2,000,000/4,000,000/10,000,000.

In the present disclosure, the particle diameter of particles may be measured using a scanning electron microscope (SEM), a transmission electron microscope (TEM), or a particle size analyzer (Malvern, Japan). Specifically, the particle diameter of particles may be a secondary particle diameter measured by dynamic light scattering on a colloidal nano solution using a particle size analyzer.

According to an embodiment of the present disclosure, there may be provided an anti-glare film including an acrylic substrate and a coating layer located on at least one side of the acrylic substrate, wherein in a graph derived from the result of Raman spectroscopy performed for the coating layer in the thickness direction from one side of the coating layer opposite to the acrylic substrate having the Y axis of a ratio of band area at the Raman peak of 1755 $cm^{-1}$ to band area at the Raman peak of 1722 $cm^{-1}$ and the X axis of a distance in the thickness direction from one side of the coating layer opposite to the acrylic substrate, a rate of change of band area ratio according to the following Equation 1 is 0.001 to 0.033/μm:

Rate of change of band area ratio=$|A_2-A_1|/3$     [Equation 1]

In the Equation 1, $A_1$ is the Y value when the X value is 4 μm, and $A_2$ is the Y value when the X value is 7 μm.

The present inventors have found that an anti-glare film including an acrylic substrate and a coating layer located on at least one side of the acrylic substrate and having a rate of change of band area ratio according to the above Equation 1 of 0.001 to 0.033/μm, 0.002 to 0.032/μm, 0.003 to 0.031/μm, 0.004 to 0.031/μm, 0.005 to 0.0.031/μm, or 0.006 to 0.031/μm has excellent adhesion between the acrylic substrate and the coating layer while having excellent optical properties such as low haze, high light transmittance and high anti-glare properties with excellent mechanical properties such as good scratch resistance and high hardness, thereby completing the present disclosure.

The Raman spectroscopy may be measured in the thickness direction of the coating layer with a reference of the coating layer, for example, one side of the coating layer opposite to the acrylic substrate. In this case, it may be measured at intervals of 0.3 to 5 μm, 0.5 to 2 μm, or 1 μm.

For example, when measuring at intervals of 1 μm, one side of the coating layer becomes a reference (0 μm), and Raman spectroscopy may be first performed. Then, second Raman spectroscopy may be performed at a position of 1 μm in the thickness direction with respect to one side of the coating layer, and third Raman spectroscopy may be performed at a position of 2 μm in the thickness direction with respect to one side of the coating layer. Thereafter, Raman spectroscopy may be sequentially performed at intervals of 1 μm in the thickness direction of the coating layer until the other side of the coating layer is in contact with the acrylic substrate. Alternatively, the acrylic substrate may also be subjected to Raman spectroscopy. For example, when a coating layer is formed on one side of the acrylic substrate, Raman spectroscopy may be performed up to one side of the acrylic substrate opposite to the coating layer.

In the graph derived by Raman spectroscopy, the X axis is a distance in the thickness direction from one side of the coating layer opposite to the acrylic substrate, and a case having the X value of 0 μm refers to one side (surface) of the coating layer opposite to the acrylic substrate. In addition, the result value may appear in the graph according to the interval. For example, when Raman spectroscopy is measured at intervals of 1 μm, the result value may appear in the graph at intervals of 1 μm on the X axis.

Also, in the graph, the Y axis is a ratio of band area at the Raman peak of 1755 $cm^{-1}$ to band area at the Raman peak of 1722 $cm^{-1}$.

Herein, the band area at the Raman peak of 1722 $cm^{-1}$ means an absorption peak of a carbon-oxygen double bond included in the entire coating layer, and the carbon-oxygen double bond may be a carbon-oxygen double bond included in an acrylate group contained in a monomer having a hydrophilic functional group and one photocurable functional group and in a polyfunctional acrylate-based oligomer.

The band area at the Raman peak of 1755 $cm^{-1}$ means an absorption peak of a stretching vibration mode of a carbon-oxygen double bond that does not participate in curing in the residual reactant included in the coating layer. Accordingly, the large band area of the peak may mean that a large number of uncured acrylate groups are distributed in the region analyzed by Raman spectroscopy. In addition, in a region where a large number of acrylate groups are distributed in the coating layer, a relatively large number of uncured acrylate groups may also be distributed.

The coating layer included in the anti-glare film according to one embodiment includes a monomer having a hydrophilic functional group and one photocurable functional group, and a polyfunctional acrylate-based oligomer as a binder component. In the process of drying them, phase separation of the binder may occur, thereby forming an intermediate layer and an anti-glare layer in the coating layer. The intermediate layer may be formed between the anti-glare layer and the acrylic substrate, and the acrylic substrate, the intermediate layer, and the anti-glare layer may be sequentially stacked.

In addition, in the graph derived by Raman spectroscopy, the Y axis is a ratio of band area at the Raman peak of 1755 $cm^{-1}$ to band area at the Raman peak of 1722 $cm^{-1}$. In the case of the anti-glare layer, the degree of change in the band area ratio analyzed in the anti-glare layer may not be large. In addition, since the anti-glare layer contains more uncured acrylates than the intermediate layer, the anti-glare layer may have a relatively large band area ratio compared to the intermediate layer.

Meanwhile, in the intermediate layer, a gradient of the content distribution of the uncured acrylate groups appears inside the intermediate layer. While the highest content of uncured acrylate groups appears at the interface between the anti-glare layer and the intermediate layer, the content of uncured acrylate groups may decrease as it approaches the acrylic substrate. Accordingly, in the case of the intermediate layer, the highest band area ratio is shown at the interface between the anti-glare layer and the intermediate layer, and the band area ratio is gradually decreased as it approaches the acrylic substrate, so that the lowest band area ratio may be shown at the interface between the intermediate layer and the acrylic substrate.

The above Equation 1 is a rate of change of the band area ratio at the Raman peak of 1755 $cm^{-1}$ to the band area ratio at the Raman peak of 1722 $cm^{-1}$ in the intermediate layer. When the rate of change of band area ratio according to Equation 1 is 0.001 to 0.033/μm, it can be confirmed that an intermediate layer having a specific thickness is formed in the coating layer. On the other hand, when the rate of change according to Equation 1 exceeds the above range, the intermediate layer may not be formed in the coating layer, and when it is less than the above range, the intermediate layer may be formed too thickly.

That is, the rate of change of band area ratio according to Equation 1 may 0.001 to 0.033/μm, 0.002 to 0.032/μm, 0.003 to 0.031/μm, 0.004 to 0.031/μm, 0.005 to 0.0.031/μm, or 0.006 to 0.031/μm. When the rate of change of band area ratio is too small, an intermediate layer to be described later is formed too thickly, so that the thickness of the anti-glare layer is relatively thin, thereby lowering mechanical properties such as scratch resistance and pencil hardness. When the rate of change of band area ratio is too large, an intermediate layer to be described later is not formed, so there is a problem in that adhesion between the acrylic substrate and the coating layer is low.

The rate of change of band area ratio according to Equation 1 may be influenced by the composition of the coating layer, for example, the composition of the binder such as a monomer and a polyfunctional acrylate-based oligomer included in the coating layer, the content or diameter of particles dispersed in the binder, or drying conditions of the coating layer.

According to another embodiment of the present disclosure, there may be provided an anti-glare film including an acrylic substrate and a coating layer located on at least one side of the acrylic substrate,
wherein in a graph derived from the result of Raman spectroscopy performed for the coating layer in the thickness direction from one side of the coating layer opposite to the acrylic substrate having the Y axis of a ratio of band area at the Raman peak of 1632 $cm^{-1}$ to band area at the Raman peak of 1722 $cm^{-1}$ and the X axis of a distance in the thickness direction from one side of the coating layer opposite to the acrylic substrate,
a rate of change of band area ratio according to the following Equation 2 is 0.001 to 0.050/μm:

Rate of change of band area ratio=$|A_4-A_3|/3$ [Equation 2]

In the Equation 2,
$A_3$ is the Y value when the X value is 4 μm, and
$A_4$ is the Y value when the X value is 7 μm.

An anti-glare film including an acrylic substrate and a coating layer located on at least one side of the acrylic substrate and having a rate of change of band area ratio according to the above Equation 2 of 0.001 to 0.050/μm, 0.002 to 0.04/μm, 0.003 to 0.03/μm, 0.004 to 0.028/μm, 0.005 to 0.026/μm, or 0.006 to 0.025/μm may have excellent adhesion between the acrylic substrate and the coating layer while having excellent optical properties such as low haze, high light transmittance and high anti-glare properties with excellent mechanical properties such as good scratch resistance and high hardness.

Meanwhile, the Raman spectroscopy according to Equation 2 may be performed in the same manner as the method and conditions for measuring the rate of change of band area ratio according to the above Equation 1.

In the graph derived by Raman spectroscopy, the X axis is a distance in the thickness direction from one side of the coating layer opposite to the acrylic substrate, and a case having the X value of 0 μm refers to one side (surface) of the coating layer opposite to the acrylic substrate. In addition, the result value may appear in the graph according to the interval. For example, when Raman spectroscopy is measured at intervals of 1 μm, the result value may appear in the graph at intervals of 1 μm on the X axis.

Also, in the graph, the Y axis is a ratio of band area at the Raman peak of 1632 $cm^{-1}$ to band area at the Raman peak of 1722 $cm^{-1}$.

Herein, the band area at the Raman peak of 1722 $cm^{-1}$ means an absorption peak of a carbon-oxygen double bond included in the entire coating layer, and the carbon-oxygen double bond may be a carbon-oxygen double bond included in an acrylate group contained in a monomer having a hydrophilic functional group and one photocurable functional group and in a polyfunctional acrylate-based oligomer.

At this time, the band area at the Raman peak of 1632 $cm^{-1}$ means an absorption peak of a stretching vibration mode of a carbon-oxygen double bond that does not participate in curing in the residual reactant included in the coating layer. Accordingly, the large band area of the peak may mean that a large number of uncured acrylate groups are distributed in the region analyzed by Raman spectroscopy.

In addition, in the graph derived by Raman spectroscopy, the Y axis is a ratio of band area at the Raman peak of 1632 $cm^{-1}$ to band area at the Raman peak of 1722 $cm^{-1}$. In the case of the anti-glare layer, the degree of change in the band area ratio analyzed in the anti-glare layer may not be large. In addition, since the anti-glare layer contains more uncured acrylates than the intermediate layer, the anti-glare layer may have a relatively large band area ratio compared to the intermediate layer.

Meanwhile, in the intermediate layer, a gradient of the content distribution of the uncured acrylate groups appears inside the intermediate layer. While the highest content of uncured acrylate groups appears at the interface between the anti-glare layer and the intermediate layer, the content of uncured acrylate groups may decrease as it approaches the acrylic substrate. Accordingly, in the case of the intermediate layer, the highest band area ratio is shown at the interface between the anti-glare layer and the intermediate layer, and the band area ratio is gradually decreased as it approaches the acrylic substrate, so that the lowest band area ratio may be shown at the interface between the intermediate layer and the acrylic substrate.

The above Equation 2 is a rate of change of the band area ratio at the Raman peak of 1632 $cm^{-1}$ to the band area ratio at the Raman peak of 1722 $cm^{-1}$ in the intermediate layer. When the rate of change of band area ratio according to Equation 2 is 0.001 to 0.050/μm, it can be confirmed that an intermediate layer having a specific thickness is formed in the coating layer. On the other hand, when the rate of change according to Equation 2 exceeds the above range, the intermediate layer may not be formed in the coating layer, and when it is less than the above range, the intermediate layer may be formed too thickly.

The anti-glare film of another embodiment may have the rate of change of band area ratio according to Equation 2 of 0.001 to 0.050/μm, 0.002 to 0.04/μm, 0.003 to 0.03/μm, 0.004 to 0.028/μm, 0.005 to 0.026/μm, or 0.006 to 0.025/μm. When the rate of change of band area ratio is too small, an intermediate layer to be described later is formed too thickly, so that the thickness of the anti-glare layer is relatively thin, thereby lowering mechanical properties such as scratch resistance and pencil hardness. When the rate of change of band area ratio is too large, an intermediate layer to be described later is not formed, so there is a problem in that adhesion between the acrylic substrate and the coating layer is low.

The rate of change of band area ratio according to Equation 2 may be influenced by the composition of the coating layer, for example, the composition of the binder such as a monomer and a polyfunctional acrylate-based oligomer included in the coating layer, the content or diameter of particles dispersed in the binder, or drying conditions of the coating layer.

FIG. 1 schematically shows a cross-section of an anti-glare film according to one embodiment of the present disclosure before and after drying. Referring to FIG. 1, the anti-glare film before drying includes an acrylic substrate 10 and a coating layer 20 formed on the acrylic substrate, and a monomer 100 having a hydrophilic functional group and one photocurable functional group, a polyfunctional acrylate-based oligomer 200, and particles 300 may be mixed in the coating layer. Meanwhile, the particles may include organic particles and/or inorganic particles.

When the drying step is performed on the anti-glare film before drying, phase separation of the binder component (a monomer 100 having a hydrophilic functional group and one photocurable functional group, and a polyfunctional acrylate-based oligomer 200) included in the coating layer 20 may occur, thereby forming an intermediate layer 30 and an anti-glare layer 40. The intermediate layer may contain 70 wt % or more of a total amount of the monomer having a hydrophilic functional group and one photocurable functional group, and the anti-glare layer may contain less than 30 wt % of a total amount of the monomer having a hydrophilic functional group and one photocurable functional group, the polyfunctional acrylate-based oligomer, the organic particles and the inorganic particles.

When performing the drying step, most of the monomer having a hydrophilic functional group and one photocurable functional group in the binder component, for example, about 70 wt % or more, 80 wt % or more, or 90 wt % or more of the total amount may be localized at the interface between the coating layer and the acrylic substrate. In addition, the intermediate layer may be formed by curing or cross-linking the monomer having a hydrophilic functional group and one photocurable functional group localized at the interface. In addition, the monomer having a hydrophilic functional group and one photocurable functional group included in the intermediate layer may be physically bonded to the acrylic substrate 10.

Accordingly, the intermediate layer 30 may contain 70 wt % or more of a total amount of the monomer 100 having a hydrophilic functional group and one photocurable functional group, and the intermediate layer may be physically bonded to the acrylic substrate 10. For example, the physical bonding between the intermediate layer and the acrylic substrate may be achieved by physically bonding the hydrophilic functional group and one photocurable functional group included in the intermediate layer with the acrylic substrate.

In addition, the intermediate layer 30 may contain some or no polyfunctional acrylate-based oligomer included in the coating layer, while containing 70 wt % or more of a total amount of the monomer 100 having a hydrophilic functional group and one photocurable functional group. For example, the intermediate layer may contain 10 wt % or less, 5 wt % or less, 1 wt % or less, 0.01 wt % or less of a total amount of the polyfunctional acrylate-based oligomer included in the coating layer. In addition, the polyfunctional acrylate-based oligomer may not be contained in the intermediate layer, and the entire polyfunctional acrylate-based oligomer may be contained in the anti-glare layer. In this case, the cross-linking density of the anti-glare layer may be increased, thereby improving mechanical properties such as scratch resistance and pencil hardness.

In addition, the intermediate layer 30 may include a portion of the acrylic substrate 10 physically bonded to the monomer 100 having a hydrophilic functional group and one photocurable functional group. For example, the intermediate layer may include the acrylic substrate in an amount of 5% or less, 3% or less, or 1% or less of the total thickness of the acrylic substrate.

In addition, on the intermediate layer 30, an anti-glare layer 40 containing 30 wt % or less, 20 wt % or less, or 10 wt % or less of the total amount of the monomer 100 having a hydrophilic functional group and one photocurable functional group, the polyfunctional acrylate-based oligomer 200, the organic particles and the inorganic particles 300 may be formed.

As described above, the intermediate layer 30 may be physically bonded to the acrylic substrate 10. In addition, since the intermediate layer and the anti-glare layer 40 are respectively formed by phase separation of the binder component included in the coating layer 20, the intermediate layer and the anti-glare layer may be formed in a state in which cross-linking is made with each other. Accordingly, in the anti-glare film according to one embodiment including the intermediate layer, adhesion between the acrylic substrate and the anti-glare layer may be greatly improved. Meanwhile, the presence or absence of the intermediate layer can be confirmed using Raman spectroscopy, and in the above graph, when the rate of change of band area ratio according to the Equation 1 is 0.001 to 0.033/μm and the rate of change of band area ratio according to the Equation 2 is 0.001 to 0.050/μm, the intermediate layer may be present.

The intermediate layer 30 and the anti-glare layer 40 may have a thickness ratio of 7:3 to 3:7, 6.5:3.5 to 3.5:6.5, or 6.2:3.8 to 4:6. When the thickness of the anti-glare layer is too thin compared to the intermediate layer, hardness and scratch resistance may be lowered. When the thickness of the anti-glare layer is too thick compared to the intermediate layer, physical bond between the substrate and the coating layer is lowered, thereby reducing adhesion.

The thickness of the coating layer 20 including the intermediate layer 30 and the anti-glare layer 40 may be 1 to 10 μm, 1.5 to 9 μm, or 2 to 8 μm. When the thickness of the coating layer is less than 1 μm, it becomes difficult to obtain the desired hardness, and when it exceeds 10 μm, curl may occur in the process of curing the resin for forming the coating layer.

In addition, the intermediate layer 30 may have a thickness of 300 nm to 7 μm, 1 μm to 6 μm, 2 μm to 5 μm, or 2.5 μm to 4 μm. Meanwhile, the anti-glare layer 40 may have a thickness of 300 nm to 7 μm, 1 μm to 6 μm, 2 μm to 5 μm, or 2.5 μm to 4 μm.

As described above, the coating layer including the intermediate layer and the anti-glare layer may include a monomer having a hydrophilic functional group and one photocurable functional group, a polyfunctional acrylate-based oligomer, organic particles and inorganic particles.

A weight ratio of the monomer having a hydrophilic functional group and one photocurable functional group, and the polyfunctional acrylate-based oligomer may be 3:7 to 5:5, 3.5:6.5 to 5:5, or 4:6 to 5:5. When the weight ratio is less than 3:7, adhesion between the coating layer and the acrylic substrate may be deteriorated, and when the weight ratio exceeds 5:5, hardness and scratch resistance may be reduced.

The coating layer may include a monomer having a hydrophilic functional group and one photocurable functional group. As described above, the coating layer includes an intermediate layer and an anti-glare layer, wherein the intermediate layer may contain 70 wt % or more, 80 wt % or more, or 90 wt % or more of a total amount of the monomer having a hydrophilic functional group and one photocurable functional group, and the anti-glare layer may contain less than 30 wt %, 20 wt % or less, or 10 wt % or less of a total amount of the monomer having a hydrophilic functional group and one photocurable functional group.

For example, the monomer having a hydrophilic functional group and one photocurable functional group may have one or more, two or more, or three or more hydrophilic functional groups, and one photocurable functional group, and is a compound capable of physical bonding with the acrylic substrate.

Specific types of the hydrophilic functional group are not limited thereto, but the hydrophilic functional group may be at least one selected from the group consisting of a hydroxyl group, an alkoxy group, a tetrahydrofurfuryl group, and a pyrrolidone group.

Specific types of the photocurable functional group are not limited thereto, but the photocurable functional group may be at least one selected from the group consisting of a vinyl group and a (meth)acrylate group.

Specific types of the monomer having a hydrophilic functional group and one photocurable functional group are not limited thereto, but the monomer may be at least one selected from the group consisting of 2-hydroxyethyl (meth) acrylate, 4-hydroxybutyl (meth)acrylate, 2-(2-ethoxyethoxy)ethyl (meth)acrylate, tetrahydrofurfuryl (meth)acrylate and N-vinyl pyrrolidone.

The monomer having a hydrophilic functional group and one photocurable functional group may be included in an amount of 20 to 70 wt %, 30 to 60 wt %, or 35 to 55 wt % with respect to 100 wt % of the coating layer (solid content). When the content of the monomer having a hydrophilic functional group and one photocurable functional group with respect to the coating layer is too small, there is a problem in that adhesion between the coating layer and the acrylic substrate is reduced. When the content of the monomer having a hydrophilic functional group and one photocurable functional group is too large, there is a problem in that hardness and scratch resistance are lowered.

The coating layer may include a polyfunctional acrylate-based oligomer. For example, the polyfunctional acrylate-based oligomer may be included in the anti-glare layer.

The polyfunctional acrylate-based oligomer may have a weight average molecular weight of 10,000 to 30,000, 11,000 to 27,000, or 13,000 to 25,000. When the weight average molecular weight of the polyfunctional acrylate-based oligomer is too small, the phase separation of the binder component does not occur well, thereby reducing scratch resistance and hardness. When the weight average molecular weight is too large, bonding strength between the intermediate layer and the acrylic substrate and/or bonding strength between the intermediate layer and the anti-glare layer is weakened, so that there is a problem of cohesive failure.

Specific types of the polyfunctional acrylate-based oligomer are not limited thereto, but the polyfunctional acrylate-based oligomer may include at least one selected from the reactive acrylate oligomer group consisting of urethane acrylate oligomer, epoxy acrylate oligomer, polyester acrylate, and polyether acrylate.

The polyfunctional acrylate-based oligomer may be included in an amount of 20 to 80 wt %, 30 to 70 wt %, or 35 to 60 wt % with respect to 100 wt % of the coating layer. When the content of the polyfunctional acrylate-based oligomer with respect to the coating layer is too small, there is a problem of lowering hardness and scratch resistance, and when the content of the polyfunctional acrylate-based oligomer is too large, there is a problem in that adhesion between the coating layer and the acrylic substrate is reduced.

The coating layer may include organic particles and inorganic particles. For example, the organic particles and the inorganic particles may be included in the anti-glare layer. Since the organic particles and the inorganic particles are included in the anti-glare layer, irregularities may be formed on one side of the anti-glare layer. For example, the irregularities may be formed on one side opposite to the side in contact with the intermediate layer.

The organic particles included in the anti-glare layer may have a diameter of 1 to 10 µm, 1.2 to 4 µm, or 1.5 to 5 µm. When the diameter of the organic particles is too small, there is a problem in that anti-glare properties are deteriorated, and when the diameter of the organic particles is too large, irregularities are formed excessively large and sparking may occur.

The organic particles may have a refractive index of 1.480 to 1.620, 1.490 to 1.610, or 1.500 to 1.600 at a wavelength of 500 to 600 nm. When including the organic particles having such a high refractive index in the anti-glare layer, it is possible to prevent sparkling defects, image formation of the lamp, and light spreading while exhibiting excellent anti-glare properties.

Specific types of the organic particles are not limited thereto. For example, the organic particles may be a single material or a copolymer of two or more selected from polystyrene, polymethylmethacrylate, polymethylacrylate, polyacrylate, polyacrylate-co-styrene, polymethylacrylate-co-styrene, polymethylmethacrylate-co-styrene, polycarbonate, polyvinyl chloride, polybutylene terephthalate, polyethylene terephthalate, polyamides, polyimides, polysulfone, polyphenylene oxide, polyacetal, epoxy resin, phenol resin, silicone resin, melamine resin, benzoguamine, polydivinylbenzene, polydivinylbenzene-co-styrene, polydivinylbenzene-co-acrylate, polydiallyl phthalate and triallyl isocyanurate polymer.

These organic particles may be included in an amount of 0.1 to 10 wt %, 0.5 to 7 wt %, or 1 to 5 wt % with respect to 100 wt % of the coating layer. When the content of the organic particles in the coating layer is too small, there is a problem in that anti-glare properties are deteriorated, and when the content of the organic particles is too large, there is a problem in that image clarity is deteriorated.

Meanwhile, the inorganic particles included in the anti-glare layer may have a diameter of 5 to 300 nm, 7 to 200 nm, or 10 to 100 nm. When the diameter of the inorganic particles is too small, there is a problem that irregularity defects may occur due to poor dispersibility, and when the diameter of the inorganic particles is too large, it is difficult to form uniform surface irregularities.

Specific types of the inorganic particles are not limited thereto, but the inorganic particles may be at least one selected from the group consisting of silica, titanium dioxide, indium oxide, tin oxide, zirconium oxide, zinc oxide and polysilsesquioxane particles (specifically, cage-structured silsesquioxane particles).

These inorganic particles may be included in an amount of 0.01 to 5 wt %, 0.03 to 3 wt %, or 0.05 to 2 wt % with respect to 100 wt % of the coating layer. When the content of the inorganic particles in the coating layer is too small, there is a problem in that irregularities are not formed, thereby lowering anti-glare properties. When the content of the inorganic particles is excessively large, there is a problem in that irregularity defects occur due to over-aggregation.

A weight ratio of the inorganic particles and the organic particles included in the anti-glare layer may be 1:1 to 100, 1:2 to 90, or 1:5 to 80. When the weight ratio of the inorganic particles and the organic particles exceeds 1:1, image clarity may be lowered or sparkling defects may occur, and when it is less than 1:100, the size of the irregularities formed on the surface of the anti-glare layer may be reduced to cause glare.

The organic particles and inorganic particles may have a particle shape such as a spherical shape, an elliptical shape, a rod shape, or an amorphous shape. In the case of the rod shape or the amorphous shape, the length of the largest dimension may satisfy the above particle diameter range, and the like.

The substrate film of the anti-glare film of one embodiment may be an acrylic substrate. Such an acrylic substrate has excellent moisture permeability and transparency, but has a problem of low adhesion with a coating layer formed on the acrylic substrate. However, in the anti-glare film according to one embodiment, an intermediate layer physically bonded to the acrylic substrate may be formed on the acrylic substrate, and an anti-glare layer cross-linked with the intermediate layer may be formed on the intermediate layer. Accordingly, such an intermediate layer may improve adhesion between the anti-glare layer and the acrylic substrate.

Specific examples of the acrylic substrate are not limited thereto, but may be, for example, an acrylic substrate including an alkyl (meth)acrylate. For example, the alkyl (meth) acrylate may be at least one selected from the group consisting of methyl acrylate, ethyl acrylate, methyl methacrylate, and ethyl methacrylate.

Meanwhile, the acrylic resin may further include at least one component selected from the group consisting of (meth) acrylic acid, maleic anhydride, and maleimides, together with the alkyl (meth)acrylate.

The acrylic substrate may be biaxially stretched. For example, a machine direction (MD) stretch ratio may be 1.1 to 2.5, 1.2 to 2.0, or 1.3 to 1.95. Meanwhile, a transverse direction (TD) stretch ratio of the acrylic substrate may be 1.1 to 3.5, 1.2 to 3.0, or 1.3 to 2.8. Since the acrylic substrate satisfies the above-described stretch ratio, mechanical properties such as toughness of the film may be excellent.

Considering excellent mechanical properties, water resistance, low moisture permeability of the acrylic substrate and excellent optical properties of the anti-glare film according to one embodiment, the thickness of the acrylic substrate may be 10 to 300 μm, 30 to 250 μm, or 40 to 200 μm, but is not limited thereto.

The anti-glare film according to one embodiment may have a light transmittance of 90.0% or more, 90.5% or more, or 91.0% or more.

In addition, the anti-glare film may have a total haze of 0.5 to 10%, 0.7 to 8%, or 0.9 to 5%.

In addition, the anti-glare film may have an internal haze of 0.3 to 7%, 0.7 to 5%, or 0.9 to 3%. The intermediate layer and the anti-glare layer may be formed by a process of applying a resin composition for forming the coating layer including a monomer having a hydrophilic functional group and one photocurable functional group, a polyfunctional acrylate-based oligomer, organic particles and inorganic particles to one side of an acrylic substrate, followed by drying and curing.

In addition, the resin composition for forming the coating layer may further include a photoinitiator. Accordingly, the photoinitiator may remain in the coating layer prepared from the above-described resin composition for forming the coating layer. As the photopolymerization initiator, any compound known to be used in the resin composition for forming a coating layer may be used without limitation, and specifically, a benzophenone-based compound, an acetophenone-based compound, a biimidazole-based compound, a triazine-based compound, an oxime-based compound, or a mixture of two or more thereof may be used.

The photoinitiator may be used in an amount of 0.1 to 10 wt %, 0.5 to 9 wt %, or 1 to 8 wt % with respect to 100 wt % of the composition. When the content of the photoinitiator is too small, an uncured residual material may be generated in the photocuring step. When the content of the photoinitiator is too large, the unreacted initiator may remain as an impurity or the cross-linking density may be lowered, thereby deteriorating mechanical properties of the film to be prepared, or greatly increasing the reflectance.

In addition, the resin composition for forming a coating layer may further include an organic solvent. Non-limiting examples of the organic solvent include ketones, alcohols, acetates, ethers, benzene derivatives, and a mixture of two or more thereof.

Specific examples of the organic solvent may include ketones such as methyl ethyl ketone, methyl isobutyl ketone, acetylacetone, or isobutyl ketone; alcohols such as methanol, ethanol, n-propanol, i-propanol, n-butanol, i-butanol, or t-butanol; acetates such as ethyl acetate, i-propyl acetate, or polyethylene glycol monomethyl ether acetate; ethers such as tetrahydrofuran or propylene glycol monomethyl ether; benzene derivatives such as toluene, xylene, or aniline; and a mixture of two or more thereof.

The organic solvent may be included in the resin composition for forming a coating layer by adding the organic solvent at the time of mixing the respective components contained in the resin composition for forming a coating layer, or by adding the organic solvent in a state that the respective components are dispersed in or mixed with the organic solvent. When the content of the organic solvent in the resin composition for forming a coating layer is too small, flowability of the resin composition for forming a coating layer is lowered and thus defects such as streaks may occur in the final film. In addition, when an excessive amount of the organic solvent is added, the solid content is lowered, so that coating and film formation may not be sufficiently performed. Accordingly, physical properties or surface properties of the film may be deteriorated, and defects may occur during drying and curing. Therefore, the resin composition for forming a coating layer may include the organic solvent such that a total solid concentration of the components contained therein is 10 to 50 wt %, or 15 to 40 wt %.

A method and device commonly used for coating the resin composition for forming a coating layer may be used without particular limitation, and for example, a bar coating method such as a Meyer bar method, a gravure coating method, a 2-roll reverse coating method, a vacuum slot die coating method, a 2 roll coating method, or the like may be used.

In the step of drying the resin composition for forming a coating layer, as described above, phase separation of the binder component (a monomer having a hydrophilic functional group and one photocurable functional group, and a polyfunctional acrylate-based oligomer) may occur. For example, 70 wt % or more of a total amount of the monomer having a hydrophilic functional group and one photocurable functional group included in the resin composition for forming a coating layer may be physically bonded to the acrylic substrate, and thus may be localized at the interface between the acrylic substrate and the coating layer. Accordingly, the monomer having a hydrophilic functional group and one photocurable functional group localized at the interface may be photocured while physically bonded to the acrylic substrate, thereby forming an intermediate layer. Accordingly, the intermediate layer may include the monomer having a hydrophilic functional group and one photocurable functional group, and a portion of the acrylic substrate physically bonded to the monomer having a hydrophilic functional group and one photocurable functional group. Meanwhile, an anti-glare layer is formed on the intermediate layer, and less than 30 wt % of a total amount of the monomer having a hydrophilic functional group and one photocurable functional group, the polyfunctional acrylate-based oligomer, the organic particles, and the inorganic particles may be included in this anti-glare layer.

This drying process may be performed at a temperature of 60 to 100° C., 65 to 95° C., or 70 to 93° C. for 30 seconds to 30 minutes, 1 minute to 25 minutes, or 2 minutes to 15 minutes.

In the photocuring step after the drying process, ultraviolet light or visible light having a wavelength of 200 to 400 nm may be irradiated, and an exposure amount during irradiation is preferably 100 to 4,000 mJ/cm$^2$, 150 to 2,000 mJ/cm$^2$, or 200 to 1,000 mJ/cm$^2$. The exposure time is also not particularly limited, and may be appropriately changed depending on the exposure device used, the wavelength of the irradiation light, or the exposure amount. Further, in the photocuring step, nitrogen purging may be performed to apply nitrogen atmosphere conditions.

According to another embodiment of the present disclosure, there may be provided a polarizing plate including the anti-glare film. The polarizing plate may include a polarizing film and an anti-glare film formed on at least one side of the polarizing film.

The material and preparation method of the polarizing film are not particularly limited, and conventional materials and preparation methods known in the art may be used. For example, the polarizing film may be a polyvinyl alcohol-based polarizing film.

A protective film may be provided between the polarizing film and the anti-glare film. The protective film may be at least one selected from a cycloolefin polymer (COP)-based film, an acrylic film, a triacetylcellulose (TAC)-based film, a cycloolefin copolymer (COC)-based film, a polynorbornene (PNB)-based film, and a polyethylene terephtalate (PET)-based film, and the present disclosure is not limited thereto.

The protective film may use a substrate for forming a single coating layer in the preparation of the anti-glare film. The polarizing film and the anti-glare film may be laminated by an adhesive such as an aqueous adhesive or a non-aqueous adhesive.

According to another embodiment of the present disclosure, there may be provided a display apparatus including the anti-glare film.

Specific examples of the display apparatus may include an apparatus such as liquid crystal display, plasma display, or organic light emitting diodes, but the present disclosure is not limited thereto.

For example, the display apparatus may be a liquid crystal display including a pair of polarizing plates facing each other; a thin-film transistor, a color filter, and a liquid crystal cell sequentially stacked between the pair of polarizing plates; and a backlight unit. In the display apparatus including an anti-glare film, the anti-glare film may be positioned on one side of the polarizing plate that is relatively far from the backlight unit among the pair of polarizing plates.

In the display apparatus, the anti-glare film may be provided on the outermost surface of the display panel on the viewer side or on the backlight side. More specifically, the display apparatus may be an apparatus for notebook display, TV display, or large-area advertising display, and the anti-glare film may be located on the outermost surface of the apparatus for notebook display, TV display, or large-area advertising display.

Advantageous Effects

According to the present disclosure, there may be provided an anti-glare film having excellent optical properties such as low haze, high light transmittance and high anti-glare properties with excellent adhesion between a substrate film and a coating layer while having excellent mechanical properties such as good scratch resistance and high hardness, a polarizing plate, and a display apparatus including the same.

BRIEF DESCRIPTION OF THE DRAWINGS

FIG. 1 schematically shows a cross-section of an anti-glare film according to one embodiment of the present disclosure before and after drying.

FIG. 2 is a photograph taken with an electron microscope of the anti-glare film of Example 1.

FIG. 3 is a graph derived from the results of Raman spectroscopy (the rate of change of band area ratio according to Equation 1) of the anti-glare film of Example 2.

FIG. 4 is a graph derived from the results of Raman spectroscopy (the rate of change of band area ratio according to Equation 1) of the anti-glare film of Comparative Example 1.

FIG. 5 is a graph derived from the results of Raman spectroscopy (the rate of change of band area ratio according to Equation 2) of the anti-glare film of Example 2.

FIG. 6 is a graph derived from the results of Raman spectroscopy (the rate of change of band area ratio according to Equation 2) of the anti-glare film of Comparative Example 1.

The present invention will be described in more detail in the following examples. However, these examples are only to illustrate the invention, and the scope of the invention is not limited thereto.

PREPARATION EXAMPLE 1: PREPARATION OF A RESIN COMPOSITION FOR FORMING A COATING LAYER 50 g of tetrahydrofurfuryl acrylate, 50 g of CN9013NS (urethane-modified 9-functional acrylate-based oligomer, weight average molecular weight: 20,000, manufacturer: Sartomer), 5 g of Irgacure 184 (manufacturer: Ciba) as an initiator, 100 g of methyl isobutyl ketone as a solvent, 0.4 g of MA-ST (silica nanoparticles, particle diameter: 12 nm, dispersion dispersed in methanol at 30%) and 2 g of first organic particles (polystyrene-polymethylmethacrylate copolymerized spherical organic particles, diameter: 2 µm, refractive index n=1.515) were mixed to prepare a resin composition for forming a coating layer of Preparation Example 1.

PREPARATION EXAMPLE 2: PREPARATION OF A RESIN COMPOSITION FOR FORMING A COATING LAYER 50 g of 2-hydroxyethyl acrylate, 50 g of CN8885NS (polyfunctional acrylate-based oligomer, weight average molecular weight: 14,000, manufacturer: Sartomer), 5 g of Irgacure 184 as an initiator, 100 g of methyl isobutyl ketone as a solvent, 0.2 g of MA-ST and 2 g of first organic particles were mixed to prepare a resin composition for forming a coating layer of Preparation Example 2.

PREPARATION EXAMPLE 3: PREPARATION OF A RESIN COMPOSITION FOR FORMING A COATING LAYER 20 g of 2-hydroxyethyl acrylate, 20 g 4-hydroxybutyl acrylate, 60 g of CN8885NS, 5 g of Irgacure 184 as an initiator, 100 g of methyl isobutyl ketone as a solvent, 0.3 g of MA-ST and 2 g of second organic particles (polystyrene-polymethylmethacrylate copolymerized spherical organic particles, diameter: 2 µm, refractive index n=1.555) were mixed to prepare a resin composition for forming a coating layer of Preparation Example 3.

COMPARATIVE PREPARATION EXAMPLE 1: PREPARATION OF A RESIN COMPOSITION FOR FORMING A COATING LAYER 20 g of 2-hydroxyethyl acrylate, 80 g of CN8885NS, 5 g of Irgacure 184 as an initiator, 100 g of methyl isobutyl ketone as a solvent, 0.7 g of MA-ST and 4 g of first organic particles were mixed to prepare a resin composition for forming a coating layer of Comparative Preparation Example 1.

COMPARATIVE PREPARATION EXAMPLE 2: PREPARATION OF A RESIN COMPOSITION FOR FORMING A COATING LAYER 50 g of pentaerythritol triacrylate (PETA), 50 g of 1,6-hexadiol diacrylate (HDDA), 5 g of Irgacure 184 as an initiator, 100 g of methyl isobutyl ketone as a solvent, 0.7 g of MA-ST and 4 g of first organic particles were mixed to prepare a resin composition for forming a coating layer of Comparative Preparation Example 2.

EXAMPLES AND COMPARATIVE EXAMPLES: PREPARATION OF AN ANTI-GLARE FILM

The resin composition for forming a coating layer prepared in one of Preparation Examples 1 to 3 and Comparative Preparation Examples 1 to 2 was coated on an acrylic substrate (manufacturer: LG Chem, thickness: 40 µm, stretch ratio MD×TD:1.95×1.8) with #12 meyer bar, and dried at 90° C. for 2 minutes. The dried material was irradiated with ultraviolet rays of 200 mJ/cm$^2$ using a mercury lamp to form a coating layer. At this time, the thickness of the coating layer was measured using a digital micrometer, and is shown in Table 1 below.

Meanwhile, a content of the monomer having a hydrophilic functional group and one photocurable functional group (tetrahydrofurfuryl acrylate, 2-hydroxyethyl acrylate, or 4-hydroxybutyl acrylate) was confirmed with respect to the total amount of the coating layer (solid content), and the results are described in [Monofunctional monomer content with respect to coating layer] of Table 1 below.

TABLE 1

|  | Ex. 1 | Ex. 2 | Ex. 3 | Comp. Ex. 1 | Comp. Ex. 2 |
| --- | --- | --- | --- | --- | --- |
| Resin composition for forming coating layer | Prep. Ex. 1 | Prep. Ex. 2 | Prep. Ex. 3 | Comp. Prep. Ex. 1 | Comp. Prep. Ex. 2 |
| Coating layer thickness (µm) | 7 | 6 | 6 | 5 | 5 |
| Monofunctional monomer content with respect to coating layer (wt %) | 46.67 | 46.70 | 37.35 | 18.33 | 0 |

1. Measurement of the Rate of Change of Band Area Ratio According to Equation 1 in Raman Spectroscopy Raman spectroscopy was performed at intervals of 1 µm in the thickness direction from the surface of the coating layer of the anti-glare film (specifically, one side opposite to the acrylic substrate of the coating layer) prepared in one of Examples and Comparative Examples, and analysis conditions of Raman spectroscopy are as follows. For Raman spectroscopy, samples were microtomed to a width of 1 to 2 µm.

<Raman Spectroscopy Conditions>
Device: RAMANtouch (manufacturer: Nanophoton)
Microscope mode: 180° back scattering
Objective Lens: TU Plan Fluor 100x/NA 0.90
Light source: Ar+ laser, wavelength 532 nm
Grating: 600 gr/mm
Spectral resolution: 2.1 cm$^{-1}$ (@ 532 nm, 600 gr/mm)
Detector: TE-cooled CCD 1340×400 pixel format Then, in the Raman spectroscopy results analyzed at intervals of 1 µm in the thickness direction, the band area at the Raman peak of 1722 cm$^{-1}$ and the band area at the Raman peak of 1755 cm$^{-1}$ were obtained by integration. And, a ratio of the band area at the Raman peak of 1755 cm$^{-1}$ to the band area at the Raman peak of 1722 cm$^{-1}$ was calculated and presented as a graph. Here, in this graph, the X axis is a distance in the thickness direction from one side (surface) of the coating layer opposite to the acrylic substrate, and the Y axis corresponds to a band area ratio.

FIG. 3 is a graph derived from the results of Raman spectroscopy (the rate of change of band area ratio according to Equation 1) of the anti-glare film of Example 2, and FIG. 4 is a graph derived from the results of Raman spectroscopy (the rate of change of band area ratio according to Equation 1) of the anti-glare film of Comparative Example 1.

In the above graph using Raman spectroscopy for the anti-glare films of Examples and Comparative Examples, the rate of change of band area ratio according to Equation 1 was measured, and the results are shown in Table 2 below. When the rate of change of band area ratio is 0.001 to 0.033/µm, it means that an intermediate layer is formed in the anti-glare film.

$$\text{Rate of change of band area ratio} = |A_2 - A_1|/3 \qquad \text{[Equation 1]}$$

In the Equation 1,
$A_1$ is the Y value when the X value is 4 μm, and
$A_2$ is the Y value when the X value is 7 μm.

2. Measurement of the Rate of Change of Band Area Ratio According to Equation 2 in Raman Spectroscopy The rate of change of band area ratio according to Equation 2 was measured under the same conditions as the 'Measurement of the rate of change of band area ratio according to Equation 1 in Raman spectroscopy'.

However, in the Raman spectroscopy results analyzed at intervals of 1 μm in the thickness direction, the band area at the Raman peak of 1722 cm$^{-1}$ and the band area at the Raman peak of 1632 cm$^{-1}$ were obtained by integration. And, a ratio of the band area at the Raman peak of 1632 cm$^{-1}$ to the band area at the Raman peak of 1722 cm$^{-1}$ was calculated and presented as a graph. Here, in this graph, the X axis is a distance in the thickness direction from one side (surface) of the coating layer opposite to the acrylic substrate, and the Y axis corresponds to a band area ratio.

FIG. 5 is a graph derived from the results of Raman spectroscopy (the rate of change of band area ratio according to Equation 2) of the anti-glare film of Example 2, and FIG. 6 is a graph derived from the results of Raman spectroscopy (the rate of change of band area ratio according to Equation 2) of the anti-glare film of Comparative Example 1.

In the above graph using Raman spectroscopy for the anti-glare films of Examples and Comparative Examples, the rate of change of band area ratio according to Equation 2 was measured, and the results are shown in Table 2 below. When the rate of change of band area ratio is 0.001 to 0.050/μm, it means that an intermediate layer is formed in the anti-glare film.

Rate of change of band area ratio=$|A_4-A_3|/3$ [Equation 2]

In the Equation 2,
$A_3$ is the Y value when the X value is 4 μm, and
$A_4$ is the Y value when the X value is 7 μm.

3. Measurement of Intermediate Layer Thickness

The anti-glare films of Examples and Comparative Examples were photographed with an electron microscope, and the thickness of an intermediate layer was measured. FIG. 2 is a photograph taken with an electron microscope of the anti-glare film of Example 1, and the thickness of the intermediate layer was measured using it.

In Table 2 below, "–" corresponds to a case in which the intermediate layer is not formed.

4. Transmittance and Haze Test

A specimen of 4 cm×4 cm was prepared from the anti-glare film obtained in one of Examples and Comparative Examples, and the haze was measured three times using a haze meter (HM-150, light source A, manufactured by Murakami). Thereafter, an average value thereof was calculated as a total haze. Herein, the transmittance and the total haze were measured at the same time. Specifically, the transmittance was measured according to the JIS K 7361 standard, and the haze was measured according to the JIS K 7136 standard.

5. Adhesion (Cross-Cut) Test

According to ASTM D3359, 100 (10)(10) cuts, each has the width and length of 1 mm, were made on the coating layer of the anti-glare film prepared in one of Examples and Comparative Examples, and a tape (product name: CT-24, manufacturer: Nichiban) was attached thereon. Then, it was peeled off and the number of remaining coating layer cells without falling off together with the tape was counted. When the number of cells remaining without falling is 100% of the total number of cells, it was evaluated as 5B. In addition, 95% or more and less than 100% was evaluated as 4B, 85% or more and less than 95% was evaluated as 3B, 65% or more and less than 85% was evaluated as 2B, 35% or more and less than 65% was evaluated as 1B, and 0% or more and less than 35% was evaluated as 0B.

6. Scratch Resistance Test

A steel wool (#0000) with a load of 500 g was reciprocated 10 times at 30 rpm on the coating layer of the anti-glare film prepared in one of Examples and Comparative Examples, and the coating layer was visually checked whether scratches occurred. When one or less scratch of 1 cm or less was observed with the naked eye, it was evaluated as good, and when more than one scratch was observed, it was evaluated as bad.

TABLE 2

|  | Ex. 1 | Ex. 2 | Ex. 3 | Comp. Ex. 1 | Comp. Ex. 2 |
| --- | --- | --- | --- | --- | --- |
| Transmittance (%) | 91.0 | 90.9 | 91.0 | 91.0 | 91.1 |
| Total haze (%) | 1.0 | 1.2 | 2.4 | 1.2 | 1.3 |
| Adhesion | 5 B | 5 B | 5 B | 0 B | 0 B |
| Scratch resistance | Good | Good | Good | Good | Good |
| Whether intermediate layer formed | Formed | Formed | Formed | Not-formed | Not-formed |
| Intermediate layer thickness (μm) | 3.5 | 3.7 | 3.0 | — | — |
| Rate of change of band area ratio according to Eq. 1 (/μm) | 0.0163 | 0.0067 | 0.0300 | 0.0780 | 0.0350 |
| Rate of change of band area ratio according to Eq. 2(/μm) | 0.0210 | 0.0067 | 0.0120 | 0.1180 | 0.0930 |

Referring to Table 2, it was confirmed that Examples 1 to 3 had the rate of change of band area ratio according to Equation 1 of 0.001 to 0.033/μm and the rate of change of band area ratio according to Equation 2 of 0.001 to 0.050/μm, and exhibited excellent optical properties such as high transmittance and low haze while having excellent adhesion between the acrylic substrate and the coating layer, and good scratch resistance.

Meanwhile, it was confirmed in Comparative Examples 1 and 2 that too little or no monomer having a hydrophilic functional group and one photocurable functional group was included or used, so that the rates of change of band area according to Equations 1 and 2 did not satisfy 0.001 to 0.033/μm and 0.001 to 0.050/μm, respectively, and adhesion between the acrylic substrate and the coating layer was lowered.

[DESCRIPTION OF SYMBOLS]

10: Acrylic substrate  
20: Coating layer  
30: Intermediate layer  
40: Anti-glare layer  
100: Monomer having hydrophilic functional group and one photocurable functional group  
200: Polyfunctional acrylate-based oligomer  
300: Particles

The invention claimed is:

1. An anti-glare film comprising an acrylic substrate and a coating layer located on at least one side of the acrylic substrate, wherein in a graph derived from the result of Raman spectroscopy performed for the coating layer in the thickness direction from one side of the coating layer opposite to the acrylic substrate, the graph having the Y axis being a ratio of a band area at the Raman peak of 1755 cm$^{-1}$ to a band area at the Raman peak of 1722 cm$^{-1}$ and the X axis being a distance in the thickness direction from the one side of the coating layer opposite to the acrylic substrate, a rate of change of a band area ratio according to the following Equation 1 is 0.001 to 0.033/μm:

Rate of change of band area ratio=$|A_2-A_1|/3$     [Equation 1]

In the Equation 1,  
$A_1$ is a Y value when an X value is 4 μm, and  
$A_2$ is a Y value when an X value is 7 μm.

2. The anti-glare film of claim 1,  
wherein the coating layer comprises a monomer having a hydrophilic functional group and one photocurable functional group, a polyfunctional acrylate-based oligomer, organic particles, and inorganic particles.

3. The anti-glare film of claim 2,  
wherein the coating layer comprises an intermediate layer containing 70 wt % or more of a total amount of the monomer having a hydrophilic functional group and one photocurable functional group; and  
an anti-glare layer containing less than 30 wt % of a total amount of the monomer having a hydrophilic functional group and one photocurable functional group, the polyfunctional acrylate-based oligomer, the organic particles, and the inorganic particles.

4. The anti-glare film of claim 3,  
wherein the intermediate layer is physically bonded to the acrylic substrate.

5. The anti-glare film of claim 3,  
wherein the monomer having a hydrophilic functional group and one photocurable functional group included in the intermediate layer is physically bonded to the acrylic substrate.

6. The anti-glare film of claim 3,  
wherein the intermediate layer comprises a portion of the acrylic substrate physically bonded to the monomer having a hydrophilic functional group and one photocurable functional group.

7. The anti-glare film of claim 3,  
wherein a thickness ratio of the intermediate layer and the anti-glare layer is 7:3 to 3:7.

8. The anti-glare film of claim 3,  
wherein the coating layer has a thickness of 1 to 10 μm.

9. The anti-glare film of claim 3,  
wherein the anti-glare layer has irregularities formed on one side.

10. The anti-glare film of claim 2,  
wherein a content of the monomer having a hydrophilic functional group and one photocurable functional group is 20 to 70 wt % based on a total amount of the coating layer.

11. The anti-glare film of claim 2,  
wherein a weight ratio of the monomer having a hydrophilic functional group and one photocurable functional group, and the polyfunctional acrylate-based oligomer included in the coating layer is 3:7 to 5:5.

12. The anti-glare film of claim 2,  
wherein the monomer having a hydrophilic functional group and one photocurable functional group is at least one selected from the group consisting of 2-hydroxyethyl (meth) acrylate, 4-hydroxybutyl (meth) acrylate, 2-(2-ethoxyethoxy) ethyl (meth) acrylate, tetrahydrofurfuryl (meth) acrylate and N-vinyl pyrrolidone.

13. The anti-glare film of claim 2,  
wherein the polyfunctional acrylate-based oligomer has a weight average molecular weight of 10,000 to 30,000.

14. The anti-glare film of claim 1,  
wherein the anti-glare film has a total haze of 0.5 to 10%, and an internal haze of 0.3 to 7%.

15. A polarizing plate comprising the anti-glare film of claim 1.

16. A display apparatus comprising the anti-glare film of claim 1.

17. An anti-glare film comprising an acrylic substrate and a coating layer located on at least one side of the acrylic substrate, wherein in a graph derived from the result of Raman spectroscopy performed for the coating layer in the thickness direction from one side of the coating layer opposite to the acrylic substrate, the graph having the Y axis being a ratio of a band area at the Raman peak of 1632 cm$^{-1}$ to a band area at the Raman peak of 1722 cm$^{-1}$ and the X axis being a distance in the thickness direction from the one side of the coating layer opposite to the acrylic substrate, a rate of change of a band area ratio according to the following Equation 2 is 0.001 to 0.050/μm:

Rate of change of band area ratio=$|A_4-A_3|/3$     [Equation 3]

In the Equation 2,  
$A_3$ is a Y value when an X value is 4 μm, and  
$A_4$ is a Y value when an X value is 7 μm.

18. The anti-glare film of claim 17,  
wherein the anti-glare film has a total haze of 0.5 to 10%, and an internal haze of 0.3 to 7%.

19. A polarizing plate comprising the anti-glare film of claim 17.

20. A display apparatus comprising the anti-glare film of claim 17.

* * * * *